United States Patent [19]
Nakano

[11] 3,710,700
[45] Jan. 16, 1973

[54] ELECTRONICALLY CONTROLLED SHUTTER

[75] Inventor: Chiuriyo Nakano, Yono, Japan

[73] Assignee: Kabushiki Kaisha Koparu, Tokyo-to, Japan

[22] Filed: Aug. 24, 1971

[21] Appl. No.: 174,474

[30] Foreign Application Priority Data

Aug. 24, 1970 Japan..............................45/74116
Sept. 25, 1970 Japan..............................45/95114
Oct. 1, 1970 Japan..............................45/97784
Oct. 14, 1970 Japan..............................45/102221

[52] U.S. Cl.............95/10 CE, 95/11.5 R, 95/53 EB, 95/63
[51] Int. Cl...................................G03b 7/08, G03b 9/24
[58] Field of Search..95/10 C, 10 CE, 10 CD, 10 CT, 95/53 R, 53 E, 53 EA, 53 EB, 63, 11.5

[56] References Cited

UNITED STATES PATENTS

| | | | |
|---|---|---|---|
| 3,587,433 | 6/1971 | Kintaro Yata | 95/63 X |
| 3,526,185 | 9/1970 | Schwarz | 95/63 |
| 3,526,184 | 9/1970 | Richter | 95/63 |
| 3,392,650 | 7/1968 | Richter | 95/63 |
| 3,373,672 | 3/1968 | Yasunori Ichiyo et al. | 95/63 |

Primary Examiner—Joseph F. Peters, Jr.
Attorney—Cushman, Darby & Cushman

[57] ABSTRACT

An electronic shutter for photographic camera comprising a shutter blade opening lever coupled directly to shutter blades which serve concurrently as the diaphragm blades, a shutter blade closing lever arranged to directly hit against one of the shutter blades and concurrently for determining the size of opening of the diaphragm aperture, a contact member for a flash luminescing means provided on the shutter blade opening lever, and diaphragm blades for a light-receiving element and arranged to be controlled of their positions starting always from the fully opened positions toward the minimum diaphragm aperture positions whenever the shutter is released. The aforesaid arrangement of the shutter enables the shutter blades to accomplish quick and precise opening and closing movement in accordance with the proper size of opening of the diaphragm aperture and with the proper exposure time which are both determined, in combination, by an automatic exposure control circuit and also enables that perfect synchronism is established always between the luminescing of the flash bulb and the full opening of the shutter blades.

5 Claims, 4 Drawing Figures

INVENTOR
CHIURIYO NAKANO

3,710,700

ELECTRONICALLY CONTROLLED SHUTTER

BACKGROUND OF THE INVENTION

1. Field of the Invention

The present invention is concerned with a shutter for a photographic camera, and more particularly, it relates to a shutter for photographic camera comprising an automatic exposure control circuit and shutter blades which concurrently serve as the diaphragm blades.

2. Description of the Prior Art

Various types of automatic exposure control circuit comprising a bridge circuit including a photoconductive cell provided on one branch of the bridge, and a delay circuit consisting, in combination, of the photoconductive cell and a capacitor have been proposed. These known automatic exposure control circuitries can potentially be adapted to each of the three kinds of shutter system, i.e., the program system shutter, the EE system shutter of the type where the shutter speed is pre-set and the EE system shutter of the type where the diaphragm aperture is pre-set. Shutters having a commercially available automatic exposure control circuit of the aforesaid type belong to one of the above-mentioned three systems. It should be noted, however, that a shutter of the type that, as a single shutter mechanism, can be used by being selectively switched over to any one of said three systems, i.e., the program system, the pre-set speed EE system and the pre-set diaphragm EE system, has never been proposed to date.

On the other hand, a proposal has been made to provide a single shutter mechanism such that it can be used to be switched selectively over to any one of the aforesaid systems by utilizing an exposure meter. However, the shutter of this type has a markedly complicated mechanism and accordingly it has not become used practically because of both the manufacturing feasibility and cost.

SUMMARY OF THE INVENTION

It is, therefore, the primary object of the present invention to provide a shutter for a photographic camera, which is of a relatively simplified structure and which is provided with shutter blades serving concurrently as the diaphragm blades and also with an automatic exposure control circuit of the aforesaid type and which can be used so as to be switched selectively over to either one of the aforesaid three kinds of systems, i.e., the program system, the pre-set speed EE system and the pre-set diaphragm EE system.

Another object of the present invention is to provide a shutter for a photographic camera, in which the shutter blades concurrently serving as the diaphragm blades are comprised of two thin plates and in which the shutter comprises a shutter blade opening member coupled directly to the shutter blades and a shutter blade closing member concurrently having the function of a member for determining the size of opening of the diaphragm aperture, which member being adapted to hit directly against one of the two shutter blades, whereby not only the shutter blades per se are able to open and close at a high speed but also the opening movement of the shutter blades is brought to a halt positively and precisely at the desired position of opening of the diaphragm aperture during the course of the movement of the shutter blades.

Still another object of the present invention is to provide 2 shutter for a photographic camera, in which synchro-contact means is provided on a shutter blade closing member having concurrently the function of a member for determining the size of opening of the diaphragm aperture, whereby at any desired size of opening of the diaphragm aperture, the luminescing time of a strobe bulb or a flash bulb is in agreement with the time at which the shutter blades are fully opened.

A further object of the present invention is to provide an electronic shutter for photographic camera, in which the shutter blade closing member has concurrently the functions of a diaphragm aperture determining member and is interlocked with a diaphragm means assigned for controlling the light-receiving area of the photoconductive cell, and the diaphragm means is adapted to move always from the fully opened position toward the minimum diaphragm aperture position upon the release of the shutter, whereby the resistance value of the photoconductive cell is adapted to make a quick change in accordance with the intensity of the incident light coming from the object to be photographed.

Other objects and attendant advantages of the present invention will become apparent by reading the following description in conjunction with the accompanying drawings.

DESCRIPTION OF THE PREFERRED EMBODIMENT

Figure 1:
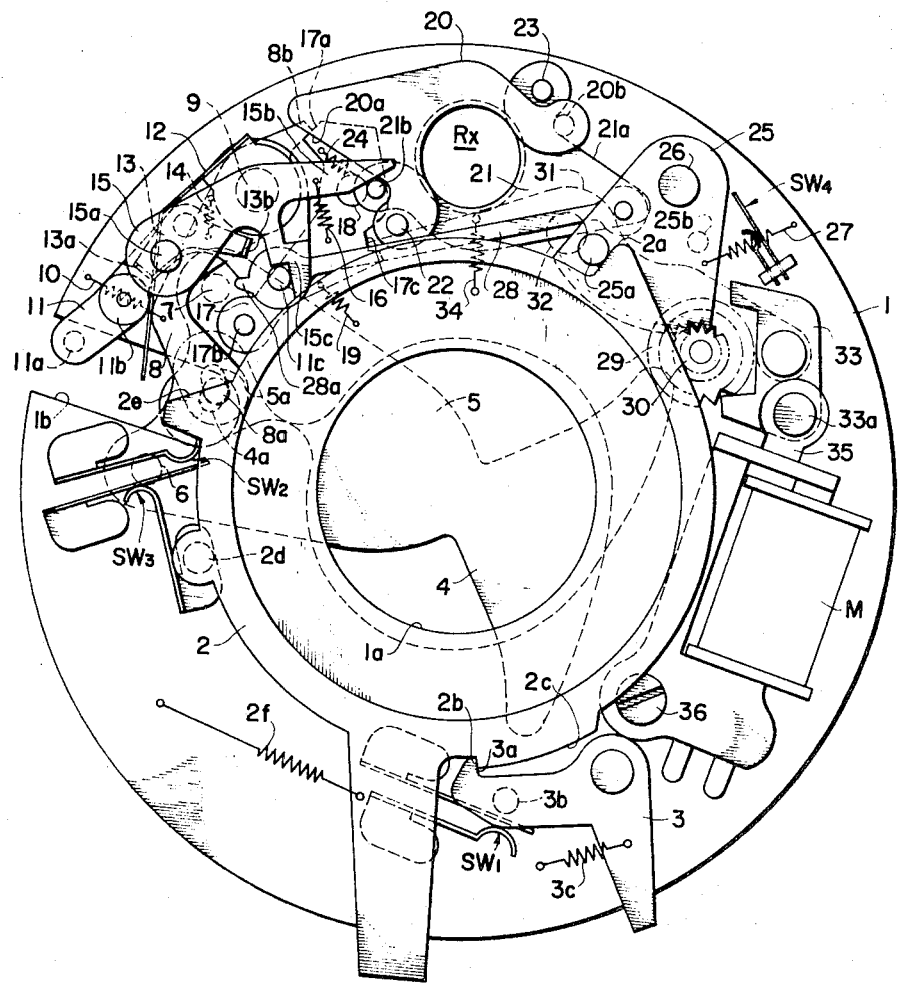
FIG. 1 is a plan view, showing an example of the mechanical arrangement of the shutter of the present invention when it is in its cocked position.

In FIG. 1, there is shown a mechanical arrangement of the shutter when it is in cocked state. Reference numeral 1 represents a base plate having an exposure aperture 1a and a cut-off portion 1b. Numeral 2 represents a release ring rotatably mounted around a lens mount, which is not shown but is secured to the base plate 1, in such a way as to be urged to rotate clockwise by a spring 2f. This release ring 2 has, circumferentially thereof, a projection 2a, a stepped portion 2b, a bulging portion 2c which is positioned adjacent to the stepped portion 2b, a pin 2d and a protrusion 2e. Numeral 3 represents a release lever which is rotatably mounted on the base plate 1 and which has a hook portion 3a adapted to engage the stepped portion 2b of the release ring 2 and has a pin 3b, and which is urged to rotate clockwise by a spring 3c. Symbol $SW_1$ represents a power switch of an automatic exposure control circuit which will be discussed later. This power switch $SW_1$ is controlled of its make and break by pin 3b of release lever 3. Symbols $SW_2$ and $SW_3$ represent a changeover switch and a control switch, respectively, of the automatic exposure control circuit which will be discussed later. These switches $SW_2$ and $SW_3$ are controlled of their make and break by the pin $2d$ of the release ring 2. Numerals 4 and 5 represent shutter blades rotatably attached onto the rear face of the base plate 1 by shafts 6 and 7, respectively. These shutter blades 4 and 5 are provided with slots $4a$ and $5a$, respectively. Shutter blades 4 and 5 concurrently serve as the diaphragm blades. Numeral 8 represents a shutter blade opening lever rotatably mounted on a shaft 9 extending from the base plate 1 and provided at its forward end with a pin $8a$ adapted to be received in common in the slots $4a$ and $5a$ of the shutter blades 4 and 5. This shutter blade opening lever 8 is urged to rotate clockwise by a spring 10. Numeral 11 represents a diaphragm aperture determining lever rotatably mounted on the shaft 9 and provided with a pin $11a$ which is adapted to be brought into contact with the end wall of one of the shutter blades 4 and 5 and also provided with an electrically insulated fixed contact member $11b$. Furthermore, this diaphragm aperture determining lever 11 has the function of a shutter blade closing lever. Numeral 12 represents a movable contact strip rotatably mounted on the shaft 9 and provided with a forward end portion which enters into the path of travel of the pin $8a$ of the shutter blade opening lever 8. Numeral 13 represents a retaining lever rotatably mounted on the diaphragm aperture determining lever 11 and having at the end of an arm a bent portion $13a$ adapted to be brought into contact with the outer side of the movable contact strip 12 and also having at the end of another arm a bent portion $13b$, respectively. Numeral 14 represents a spring which lightly urges the retaining lever 13 to rotate counter-clockwise and which, thereby, is assigned — in normal state — to positively retain, in cooperation with the movable contact strip 12, the retaining lever 13 in the position shown in FIG. 1. Numeral 15 represents an interlocking lever having an end portion rotatably mounted on a shaft $15a$ extending from a member which is not shown but is integral with the base plate 1 and having the other end portion in which two arms $15b$ and $15c$ are formed. This interlocking lever 15 is urged to rotate clockwise by a spring 16. Numeral 17 represents a locking lever rotatably mounted on a shaft 18 extending from the base plate 1 and urged to rotate counter-clockwise by a spring 19. This locking lever 17 has an end portion $17a$ which is adapted to engage the end portion $8b$ of the shutter blade opening lever 8 whenever the lever 8 is in the shutter blade closing position, and has the other end portion provided with a pin $17b$ which enters into the path of travel of the protrusion $2e$ of the release ring 2. Numerals 20 and 21 represent diaphragm blades rotatably mounted at one end on shafts 22 and 23, respectively, which extend from the base plate 1, and provided at the other end with pins $20b$ and $21b$ extending therefrom and each being adapted to be brought into contact with the cam faces $20a$ $21a$, respectively, of the diaphragm blade for each other pin. These diaphragm blades 20 and 21 are arranged so that they are able to cover the light-receiving face of a photoconductive cell Rx which will be described later. Numeral 24 represents a spring for urging the diaphragm blade 21 to rotate clockwise. Numeral 25 represents a shutter blade closure driving member or a sector gear which is rotatably mounted on a shaft 26 extending from the base plate 1 and which is provided with a pin $25a$ adapted to engage the projection $2a$ of the release ring 2 and also provided with a pin $25b$ for breaking a switch $SW_4$ connected in series with the power switch $SW_1$ and having the tendency to make. This sector gear or the shutter blade closure driving member 25 is urged to rotate counter-clockwise by a spring 27. Numeral 28 represents a coupling rod having one end rotatably attached to the shutter blade closure driving member 25 and the other end rotatably attached to the diaphragm aperture determining lever 11 by a pin $11c$ which is adapted to be brought into contact with an arm $15c$ of the interlocking lever 15. Numeral 29 represents a serrated gear rotatably supported on the base plate 1 integrally and concentrically with a pinion gear 30, which, in turn, meshes with the shutter blade closure driving member 25. Numeral 31 represents an anchor support lever which is rotatably mounted on a shaft 32 extending from the base plate 1. This anchor support lever 31 has one end which pivotably supports an anchor 33 adapted to mesh with the serrated gear 29, and the other end which is capable of engaging the back side $17c$ of the locking lever 17. Numeral 34 represents a spring for urging the anchor support lever 33 to rotate counter-clockwise. M represents an electromagnet which is secured to the base plate 1 and is controlled of its time of energization by an automatic exposure control circuit which will be discussed later. Numeral 35 represents an armature facing the magnetic pole of the electromagnet M and having one end rotatably attached onto the anchor 33 by a shaft $33a$ and the other end rotatably mounted on a shaft 36 extending from the base plate 1. The arm $15b$ of the interlocking lever 15 is in contact with the pin $21b$ of the diaphragm blade 21. Also, selection of springs is made so that at least the spring 27 is of a spring force greater than that of the spring 10 and also that the spring 16 is of a spring force greater than that of the spring 24. In addition, the electromagnet M is selected so that it has an attracting force which is greater than the pulling force of the spring 34.

Figure 2:
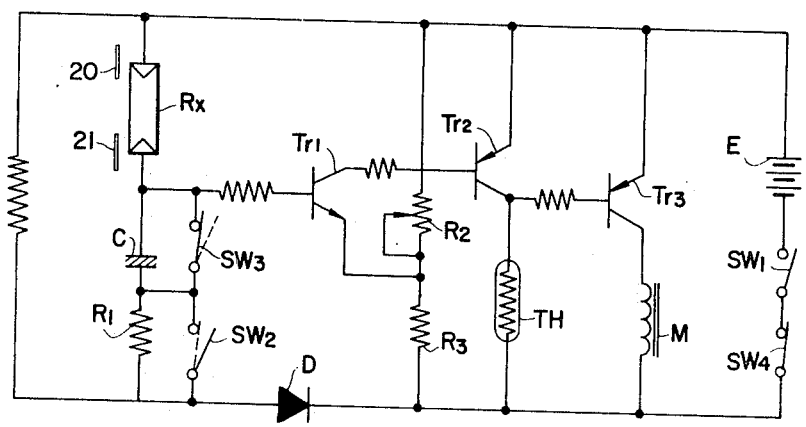
FIG. 2 is a circuit diagram, showing an example of the automatic exposure control circuit adapted to the shutter of the present invention.

FIG. 2 shows an example of the automatic exposure control circuit for controlling the opening and closing actions of the shutter of the present invention. C represents a capacitor for constituting a delay circuit in combination with the photoconductive cell Rx such as CdS. $Tr_1$, $Tr_2$ and $Tr_3$ represent transistors. $R_1$, $R_2$ and $R_3$ represent resistors for constituting a bridge circuit in cooperation with the photoconductive cell Rx. D represents a diode. TH represents a thermistor. E represents a power source battery.

Description will hereunder be made on the actions of the shutter of the present invention. FIG. 1 shows the state of the shutter in which it is cocked. In this cocked state of the shutter, let us assume that the release lever 3 is rotated counter-clockwise against the force of the spring $3c$. Whereupon, the hook portion $3a$ of the release lever 3 is relieved of its engagement with the stepped portion $2b$. At the same time therewith, the power switch $SW_1$ is closed by the pin $3b$ of the release lever 3. Accordingly, the automatic exposure control circuit which is shown in FIG. 2 is rendered operative. On the other hand, the release ring 2 starts a clockwise rotating movement by the force of the spring $2f$. As the release ring 2 makes this clockwise rotating movement, the pin 25a is relieved of its restraint effected till then by the projection 2a. As a consequence, the shutter blade closure driving member 25 is caused to make a counter-clockwise rotation at a relatively low speed by the action of the spring 27 while causing the anchor 33 to make repeated small pivotal movements or vibration. This counter-clockwise rotation of the shutter blade closure driving member 25 is transmitted, via the coupling rod 28, to the diaphragm aperture determining lever 11 and also to the interlocking lever 15 so that these two levers are also rotated counter-clockwise, respectively. As the interlocking lever 15 makes this counter-clockwise rotating movement, the pin 21b which is in contact with the arm 15b of the interlocking lever 15 tends to follow this movement by the force of the spring 24. Whereupon, the diaphragm blade 21 rotates clockwise about its supporting shaft 23. At the same time therewith, the pin 21b pushes the cam face 20a of the diaphragm blade 20 to cause this diaphragm blade 20 to rotate also clockwise about its supporting shaft 22. As a result, the diaphragm blades 20 and 21 progressively reduce the light-receiving area of the photoconductive cell Rx. Accordingly, the resistance value of the photoconductive cell Rx effects a gradual change so that the bridge circuit is eventually brought into an equilibrium state. When the bridge circuit thus attains to the balanced state, the transistors $Tr_1$ and $Tr_2$ are switched in its state from conductive to non-conductive, whereas the transistor $Tr_3$ is changed over in its state from the "cut-off" state to the "on" state, respectively, so that a current is supplied to the electromagnet M. As a result, the electromagnet M attracts the armature 35 and retains it thereto. Accordingly, the anchor 33 is held stationary in its state of meshing with the serrated gear 29, stopping the counter-clockwise rotation of the shutter closure driving member 25. At the same time therewith, the counter-clockwise rotation of the diaphragm aperture determining lever 11 and the closing movement of the diaphragm blades 20 and 21 are brought to a halt also. During this part of operation, the fixed contact member 11b, the movable contact strip 12 and the retaining lever 13 as a whole are caused, upon the counter-clockwise rotation of the diaphragm aperture determining lever 11, to move toward the center of the exposure aperture 1a, while holding their positional relationship which is shown in FIG. 1, and eventually they are brought to a halt.

Figure 4:
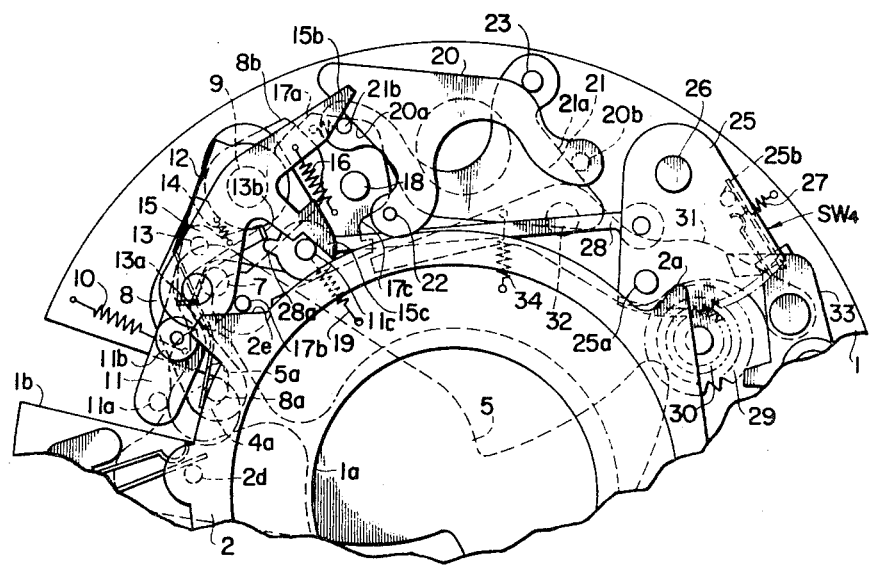
FIG. 4 is a plan view of the essential parts corresponding to that in FIG. 1, showing the state assumed thereby at the time of completion of an exposure.

Immediately after the counter-clockwise rotation of the diaphragm aperture determining lever 11 has stopped, or in other words, immediately after the movement of the pin 11a toward the center of the exposure aperture 1a has stopped in the aforesaid way, the pin 17b is pushed up by the protrusion 2e of the release ring 2 so that the locking lever 17 is caused to make a clockwise rotation. As a result, the end portion 17a of the locking lever 17 is relieved of its engagement with the end portion 8b of the shutter blade opening lever 8. Accordingly, the shutter blade opening lever 8 is caused to make a clockwise rotation about the supporting shaft 9 by the force of the spring 10 to thereby open the shutter blades 4 and 5. This opening movement of the shutter blades 4 and 5 is then stopped as the end of the base portion of one of the shutter blades hits against the pin 11a of the diaphragm aperture determining lever 11, so that the size of the opening of the diaphragm aperture is determined (see FIG. 3). During this part of operation, said one of the shutter blades which hits against the pin 11a bounces at the time of hitting and thus tends to cause the shutter blade opening lever 8 to make a counter-clockwise rotation via either the slot 4a or 5a. However, at such a time, the other of the shutter blades has not yet hit against the pin 11a. Therefore, this other of the shutter blades tends to cause, by the force of inertia, the shutter blade opening lever 8 to rotate clockwise further. However, the aforesaid two kinds of driving forces which are applied in opposite directions to the shutter blade opening lever 8 are substantially equal in magnitude with each other. As a consequence, these two kinds of forces cancel each other to be altered into small vibration. As a result, the shutter blades 4 and 5 are brought to a halt instantaneously at a position established by the pin 11a. Also, immediately before said one of the shutter blades hits against the pin 11a, the pin 8a of the shutter blade opening lever 8 pushes the forward end of the movable contact strip 12 to cause the latter to be brought into contact with the fixed contact member 11b. Accordingly, in case a known flash circuit is connected between the fixed contact member 11b and the movable contact strip 12, the flash circuit is closed so that the opening of the shutter blades 4 and 5 is synchronized with the luminescing of the flash bulb or the strobe bulb employed. At the very time that the shutter blades 4 and 5 have become thus opened up to the desired size of opening of the diaphragm aperture, the pin 2d of the release ring 2 pushes the common movable strip of both the changeover switch $SW_2$ and the control switch $SW_3$ to effect a switching in such a way as shown by the dotted lines in FIG. 2, and thus the switch $SW_2$ is closed, whereas the control switch $SW_3$ is opened. Accordingly, at this moment, the automatic exposure control circuit starts the action as a delay circuit, so that there is started a charging of the capacitor C via the photoconductive cell Rx. When the voltage between the terminals of the capacitor C attains to a predetermined value in this way, or in other words, when an exposure time which is determined by the factors, i.e., the brightness of the object to be photographed and the predetermined size of opening of the diaphragm aperture, has elapsed, the transistors $Tr_1$ and $Tr_2$ are switched from the "off" state to the "on" state, whereas the transistor $Tr_3$ is switched from the conductive state to the non-conductive state, respectively. Thus, the current supplied to the electromagnet M is interrupted. As a result, the electromagnet M is deprived of its magnetic force and releases the armature 35 therefrom. As stated previously, when the locking lever 17 was caused to make a clockwise rotation, the end portion of the anchor supporting lever 31 had already been relieved of its retainment which was effected priorly by the back portion 17c of the locking lever 17. Therefore, the anchor supporting lever 31 is rotated counter-clockwise by the force of the spring 34 at the same time with the release of the armature 35, causing the anchor 33 to move away from its position of meshing with the serrated gear 29. Accordingly, at this very moment, the shutter blade closure driving member 25 is caused to make a quick counter-clockwise rotation starting at the position shown in FIG. 3 by the force of the spring 27. Whereupon, the pin 25b opens the switch $SW_4$ to render the exposure control circuit inoperative. The aforesaid counter-clockwise rotation of the shutter blade closure driving member 25 causes both the diaphragm aperture determining lever 11 and the interlocking lever 15 to be quickly rotated counter-clockwise also, starting at their positions shown in FIG. 3, via the coupling rod 28. Accordingly, the diaphragm aperture determining lever 11 causes, by its pin 11a, the shutter blades 4 and 5 to close together against the tendency of the shutter blade opening lever 8, whereas the interlocking lever 15 causes the diaphragm blades 20 and 21 to move up to their positions of the minimum diaphragm aperture. Also, during this part of operation, the projection 28a of the coupling rod 28 engages the bent portion 13b of the retaining lever 13 to rotate this lever 13 counter-clockwise. Accordingly, the movable contact strip 12 is pushed by the bent portion 13a in the direction in which the movable contact strip 12 parts away from the fixed contact member 11b, so that the flash circuit is positively opened. Thus, the whole course of an exposure action completes (see FIG. 4).

Figure 3:
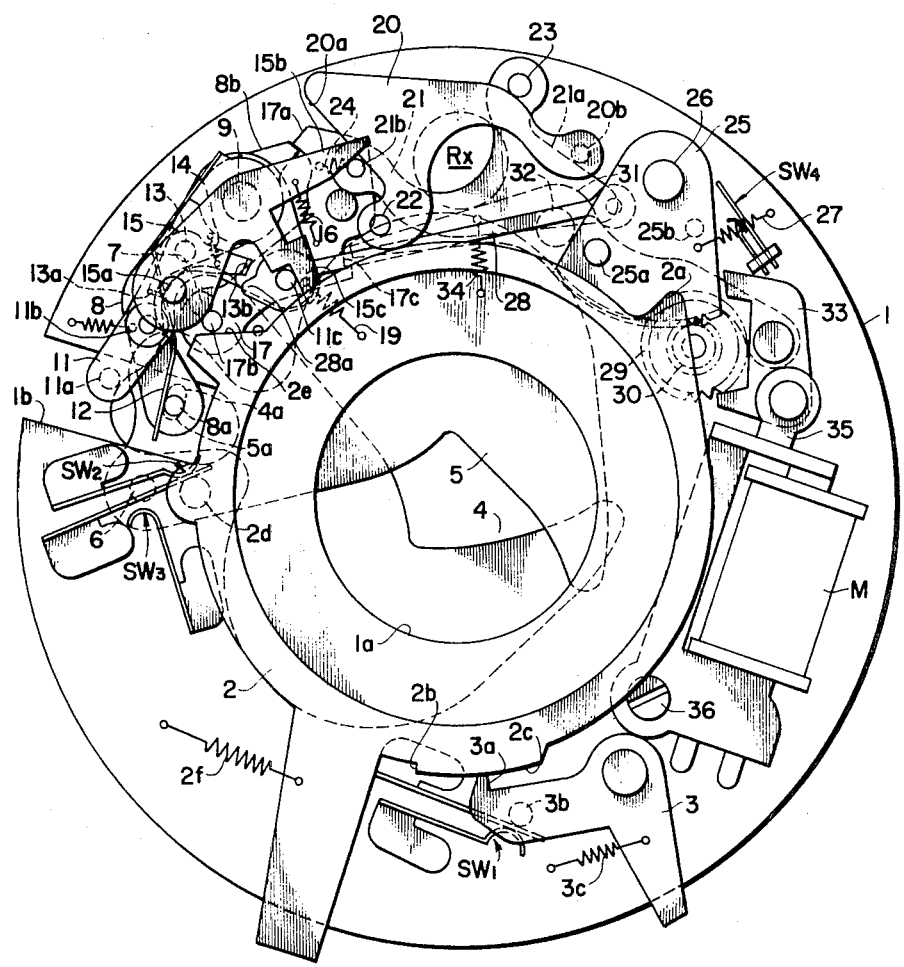
FIG. 3 is a plan view corresponding to that in FIG. 1, showing the state in which the shutter blades are opened.

The cocking operation of the shutter is accomplished by rotating the release ring 2 counter-clockwise, starting at its position shown in FIG. 3, against the force of the spring 2f. The release ring 2 is retained in its position shown in FIG. 1 as its stepped portion 2b engages the hook portion 3a of the release lever 3 during the final stage of the aforesaid counter-clockwise rotation of the release ring 2. During this part of operation, the projection 2a of the release ring 2 pushes up the pin 25a of the shutter blade closure driving member 25 to rotate this member 25 clockwise against the force of the spring 27. Accordingly, the diaphragm aperture determining lever 11, the interlocking lever 15 and the diaphragm blades 20 and 21 are caused to assume their state in FIG. 1, respectively. Also, owing to the counter-clockwise movement of the protrusion 2e, the locking lever 17 is caused to rotate counter-clockwise by the force of the spring 19. Accordingly, the forward end portion 17a of the locking lever 17 engages the end portion 8b of the shutter blade opening lever 8 to retain this lever 8 in its position shown in FIG. 1. Furthermore, both the power switch $SW_1$ and the changeover switch $SW_2$ are switched onto the opened state, whereas the control switch $SW_3$ and the switch $SW_4$ are switched onto the closed state, respectively. It should be noted that, as the diaphragm aperture determining lever 11 returns to its position shown in FIG. 1, the retaining lever 13 is relieved of its engagement with the projection 28a of the coupling rod 28 a little later than the clockwise rotating movement of the diaphragm aperture determining lever 11. At the same time, the retaining lever 13 is rotated clockwise for a small distance against the force of the spring 14 by the force of the movable contact strip 12 as this latter strip 12 returns to its normal position. Thus, the movable contact strip 12 is returned again to the position shown in FIG. 1 without being brought into contact with the fixed contact member 11b. In this way, the entire parts of the mechanism are held again in their cocked positions shown in FIG. 1.

Description has been made on an instance in which the shutter of the present invention is utilized as a program system shutter. As is clear from the foregoing description, however, it is possible — according to the present invention — to utilize this shutter not only as a pre-set diaphragm EE system shutter but also as a pre-set speed EE system shutter as well. More specifically, in case it is intended to utilize this shutter as a pre-set diaphragm EE system shutter, it is only necessary to arrange, by the use of a diaphragm aperture setting member not shown, so that the closing movement of the pin 21b of the diaphragm blade 21 which is performed when the shutter is released is coercively stopped at a desired position during the whole course of the aforesaid closing movement of the pin 21b. Also, in case it is intended to utilize this shutter as a pre-set speed EE system shutter, it is only necessary to arrange so that the slider of the variable resistor $R_2$ shown in FIG. 2 can be moved to a desired position by a shutter speed setting member not shown.

I claim:

1. A shutter for a photographic camera comprising an automatic exposure control circuit including a bridge circuit having a photoconductive cell in one branch of said bridge, and a delay circuit consisting of said photoconductive cell and a capacitor connected in series with said photoconductive cell; an electromagnet with its time of energization controlled by said automatic exposure control circuit; shutter blades serving and functioning concurrently as diaphragm blades; a shutter blade opening member coupled to said shutter blades and biased in the direction of opening said shutter blades; a shutter blade closing member movably positioned into the path of movement of said shutter blades and biased in the direction of closing said shutter blades, said shutter blade closing member serving and functioning concurrently as a diaphragm aperture determining member; diaphragm means mounted in the immediate foreground of said photoconductive cell and connected to said shutter blade closing member for altering the light-receiving area of said photoconductive cell; and retard means detachably coupled to said shutter blade closing member for stopping the movement of said shutter blade closing member whenever said electromagnet is energized following the release of the shutter and also for detaching itself from said shutter closing member whenever said electromagnet is de-energized after said energization.

2. A shutter for a photographic camera according to claim 1, in which said shutter blades are comprised of two thin plates and said shutter blade closing member is caused to hit against one of said shutter blades whenever said shutter blades are opened.

3. A shutter for a photographic camera according to claim 1, in which said shutter blade closing member comprises a fixed contact member and a movable contact member which are caused to contact each other by said shutter blade opening member whenever said shutter blades are opened.

4. A shutter for a photographic camera according to claim 1, in which said diaphragm means is comprised of two thin plates, one of which is caused to move by virtue of the movement of the other whenever the latter is moved.

5. A shutter for a photographic camera according to claim 1, in which said shutter comprises an interlocking lever engaging both said shutter closing member and said diaphragm means and is operative so that, whenever said shutter is cocked, said diaphragm means is held in the fully opened position by said interlocking lever.

* * * * *